Feb. 25, 1969     C. G. ROBERTS     3,429,303

INTERNAL COMBUSTION ENGINE WITH IMPROVED INTAKE AND EXHAUST

Filed Feb. 23, 1967     Sheet 1 of 3

INVENTOR
CHARLES G. ROBERTS

BY *Hauke, Kesse, & Wifford*
ATTORNEYS

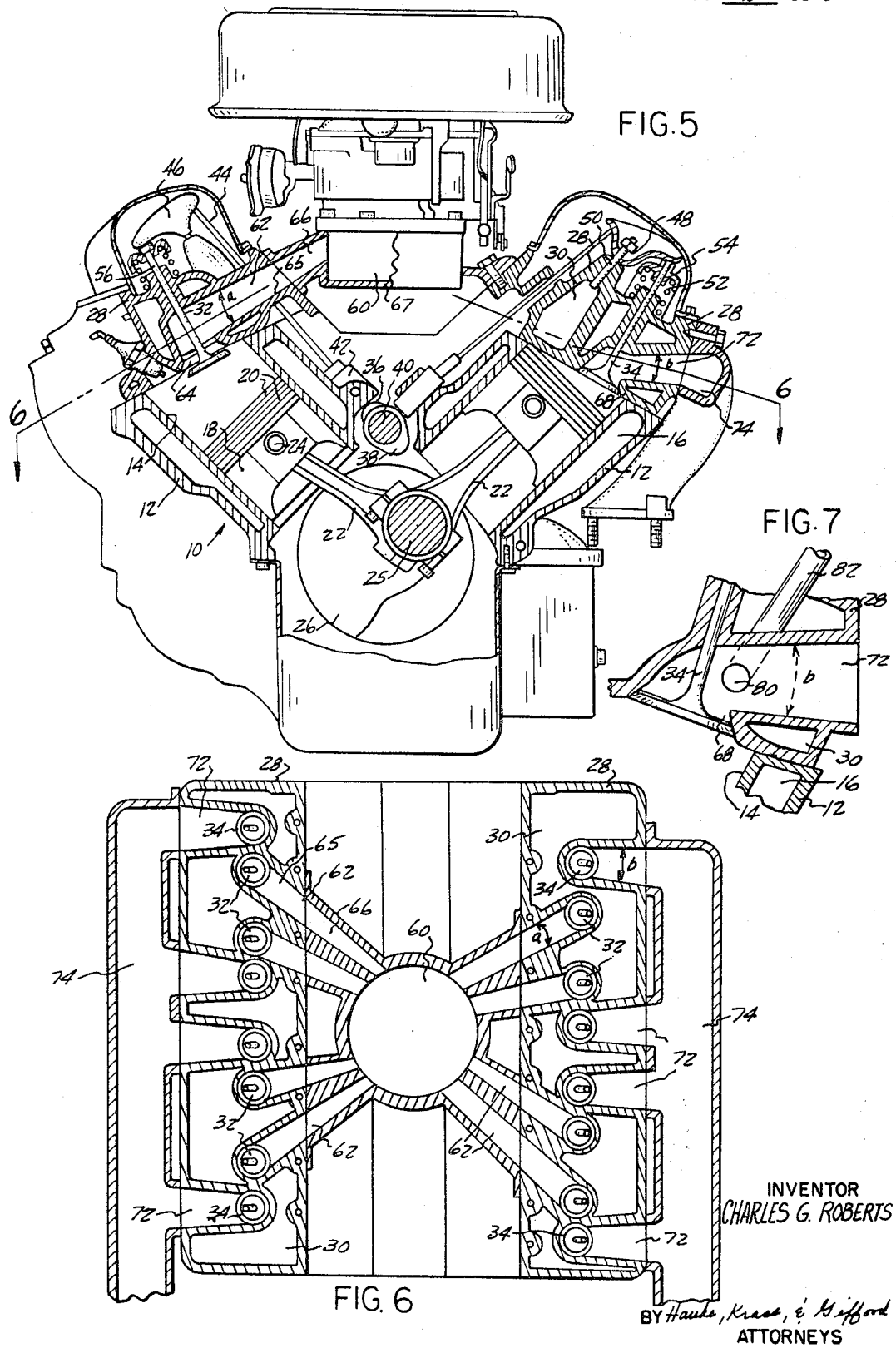

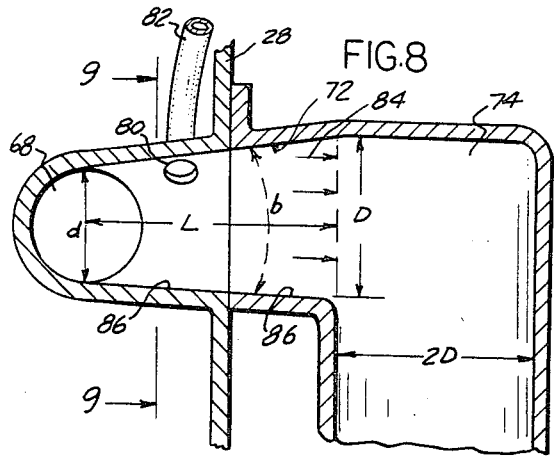
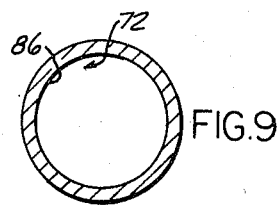
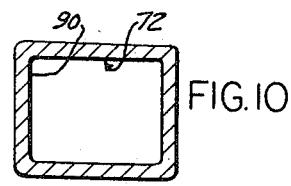
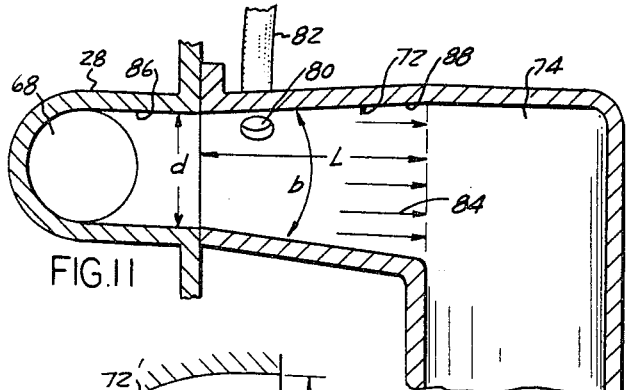
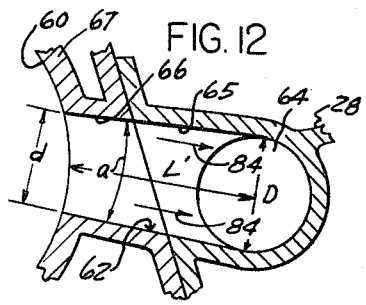
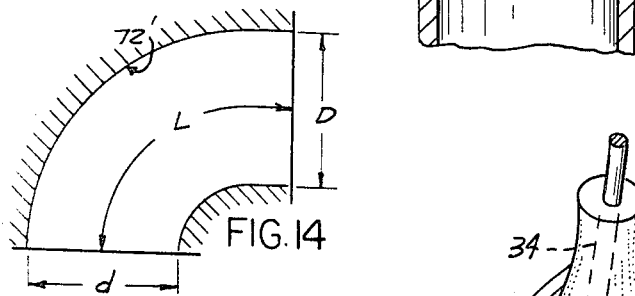
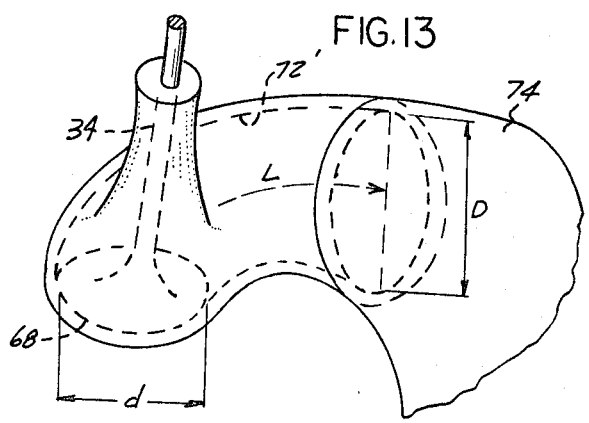
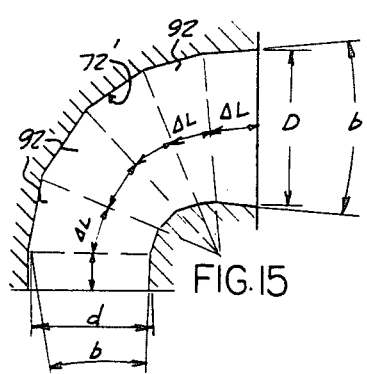
INVENTOR
CHARLES G. ROBERTS

United States Patent Office 3,429,303
Patented Feb. 25, 1969

3,429,303
INTERNAL COMBUSTION ENGINE WITH
IMPROVED INTAKE AND EXHAUST
Charles G. Roberts, 1015 N. Michigan,
Howell, Mich. 48843
Filed Feb. 23, 1967, Ser. No. 617,957
U.S. Cl. 123—59                                17 Claims
Int. Cl. F02b 29/02, 75/20, 75/22

ABSTRACT OF THE DISCLOSURE

A configuration for intake and outlet passageway, for internal combustion engines providing such passageway with a substantially frusto-conical shape having a conicity comprised between about 0 and 10° with the largest cross-area portion thereof disposed at the passageway outlet. Auxiliary air inlet means may be provided in the outlet passageway.

Cross-reference to related applications

Application Ser. No. 492,283, filed July 15, 1965, for Fluid Fittings, in the name of Charles G. Roberts.

Background of the invention

As is well known, internal combustion engines are far from being ideal energy conversion machines. Furthermore, specially in multicylinder internal combustion engines, it is difficult to provide equal air to fuel mixture ratios at the intake of all cylinders, with the result that a compromise must be reached whereby too rich a mixture is usually used so as to provide a rich enough mixture for the cylinders furthest removed from the intake plenum chamber for the purpose of providing a correct combustion of the charge in every cylinder. There results too rich a mixture for some of the cylinders, with a correspondingly substantially large proportion of unburnt fuel and of carbon monoxide being rejected to the atmosphere by the exhaust of those cylinders operating with too rich a mixture at their intake, thus greatly contributing to atmospheric pollution.

In order to eliminate such unburnt hydrocarbons from the exhaust, it has been proposed to condensate and eliminate the unburnt hydrocarbons, in apparatus incorporated into the exhaust system or, alternately, it has been proposed to employ an exhaust "afterburner" having auxiliary air inlet into the exhaust system for the purpose of providing further oxidation of the unburnt hydrocarbons and of the carbon monoxide for rejecting more completely burnt residual gases in the atmosphere in order to reduce pollution. Such arrangements result in considerable power loss, in an increase in heat which must be rejected by way of increased capacity cooling systems, and in added maintenance and repair costs.

It is also well known that the exhaust system of conventional internal combustion engines normally create a substantial back pressure that causes difficulties in proper scavenging of the burnt gases exhausted from each cylinder, with the result that the usual expedient compromise for improving scavenging is in timing the opening of each cylinder exhaust valve such that the valve is caused to open long before the end of each piston power stroke, i.e. long before the bottom dead center position of the crankshaft throw associated with that particular cylinder, such that further unburnt hydrocarbons are rejected into the atmosphere, and that the overall efficiency of the internal combustion engine substantially suffers.

The present invention, by appropriate design of each intake passageway between the intake plenum chamber which, in the case of a spark ignition engine, is the carburetor plenum chamber, and each cylinder intake port combined with an appropriate design of each exhaust passageway from each cylinder exhaust port to the exhaust manifold provides a much improved combustion of the air-fuel mixture within each cylinder combustion chamber such that the engine may be operated close to the ideal air to fuel mixture ratio of 18 to 1 which, under all the conditions prevalent in conventional internal combustion engines, results in too lean a mixture to insure proper functioning of the engine. According to the present invention, either the intake passageways or the exhaust passageways, or both, are substantially circular in cross-section and frusto-conical in shape along their longitudinal axis, with the largest diameter, or largest cross-area portion of each passageway disposed downstream at the outlet of each passageway. Consequently an intake passageway has its largest diameter portion situated proximate the engine intake valve, while an exhaust passageway, has its smallest diameter portion situated proximate the engine exhaust valve. With an arrangement whereby the exhaust passageways associated with an internal combustion engine have such frusto-conical longitudinal shape, the exhaust of burnt gases from each engine cylinder is so improved that the exhaust valve may remain closed for most of the piston power stroke and is timed to open only a few degrees before bottom dead center, with the accompanying improvement in efficiency of the engine, together with the considerable improvement resulting from the complete combustion of the air-fuel charge in each cylinder. Additionally, the invention contemplates providing an auxiliary air inlet disposed in each exhaust passageway, resulting in improved cooling of the exhaust valve and of the exhaust gases before they are discharged into the exhaust manifold of the engine, with further assurance of complete oxidation of any raw hydrocarbon remaining in the exhaust, as would be the case in the event of cold start with the carburetor choke mechanism in action or in the event that the carburetor air-fuel mixing system is not properly adjusted, or, in compression ignition engines, in the event that the fuel injecting system is not properly adjusted or balanced or that there is an obstruction in the air inlet piping.

Consequently, the principal object of the present invention is to provide an improved internal combustion engine having a frusto-conical exhaust and/or inlet passageway for each cylinder, so as to provide improved combustion of the fuel-air mixture charge delivered to each cylinder and so as to improve scavenging of burnt gases from each cylinder, thereby considerably improving the overall efficiency of the engine.

A further object of the present invention is to provide an internal combustion engine with frusto-conical exhaust passageways resulting in improved scavenging of burnt gas from each cylinder of the engine permitting timing the opening of each exhaust valve so as to cause it to remain closed for a longer period of time, or for a longer angular rotation of the crankshaft throw associated with each cylinder, during the combustion cycle of such a cylinder.

Another object of the present invention is to provide at least one auxiliary air inlet port in each exhaust passageway of an internal combustion engine, with the accompanying result of discharging to the atmosphere completely burnt and substantially cooled residual gases.

Yet a further object of the present invention is to provide an internal combustion engine with frusto-conical intake passageways capable of suplying air-fuel mixtures in the same ratio to all the cylinders of a multicylinder internal combustion engine, irrespective of the location of each cylinder in a cylinder block, and further providing full charges to be delivered to each cylinder, irrespective of the distance separating such cylinder from the air-fuel mixing apparatus.

Yet another object of the present invention is to provide an internal combustion engine capable of discharging no, or little, unburnt hydrocarbons into the atmosphere, so as to considerably reduce air pollution.

Other objects and advantages of the invention will become apparent to those skilled in the art when the following description of some of the best modes contemplated for practicing the invention is read in conjunction with the accompanying drawing, wherein

*Brief description of the drawings*

FIG. 5 is a transverse cross-sectional view of an internal combustion engine having its cylinders disposed in V, which is provided with improved intake and exhaust passageways according to the present invention;

FIG. 6 is a longitudinal cross-sectional view of the engine of FIG. 5 substantially from line 6—6 of FIG. 5;

FIG. 7 is a partial enlarged view of a portion of FIG. 5 incorporating a modification according to the present invention;

FIG. 8 is an enlarged schematic view of a portion of FIG. 6;

FIG. 9 is a lateral cross section from line 9—9 of FIG. 8;

FIG. 10 is a modification of FIG. 9;

FIG. 11 is a modification of the structure shown in FIG. 8;

FIG. 12 is an enlarged schematic view of a portion of FIG. 6;

FIG. 13 is a perspective schematic view of an internal combustion engine exhaust passageway according to a modification of the invention;

FIG. 14 is a schematic longitudinal sectional view of the passageway of FIG. 13; and FIG. 15 is a diagrammatical illustration of the principles of the configuration of FIGS. 13–14.

*Description of the preferred embodiments*

Figure 2:
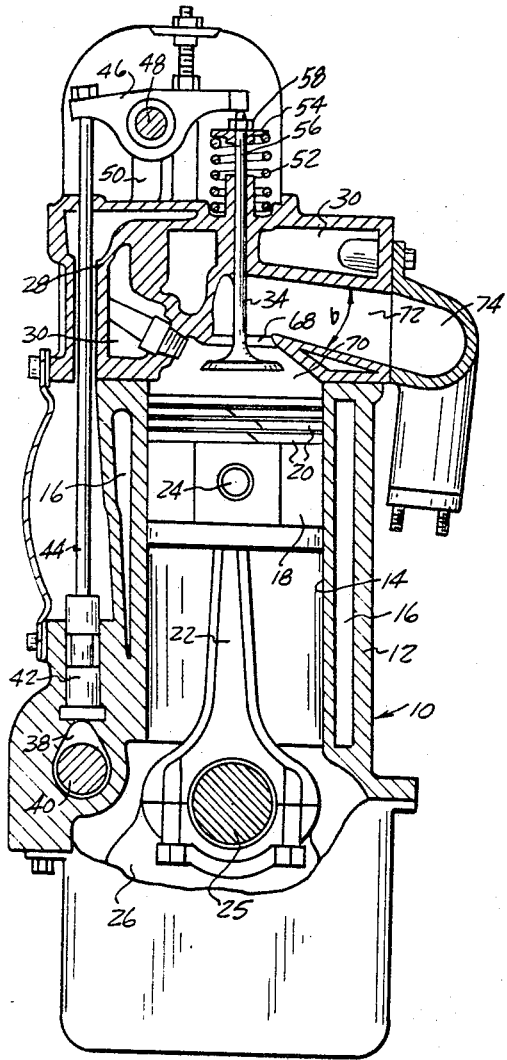
FIGS. 1 and 2 represent respectively transverse cross-sections of the intake and exhaust portions of an internal combustion engine having its cylinders disposed in line, which is provided with improved intake and exhaust passageways according to the present invention;–
Figure 1:
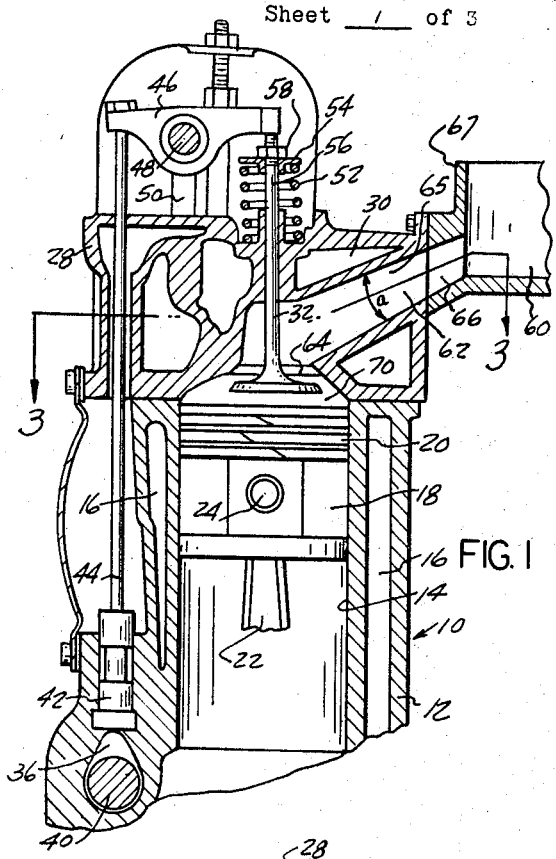
Figure 3:
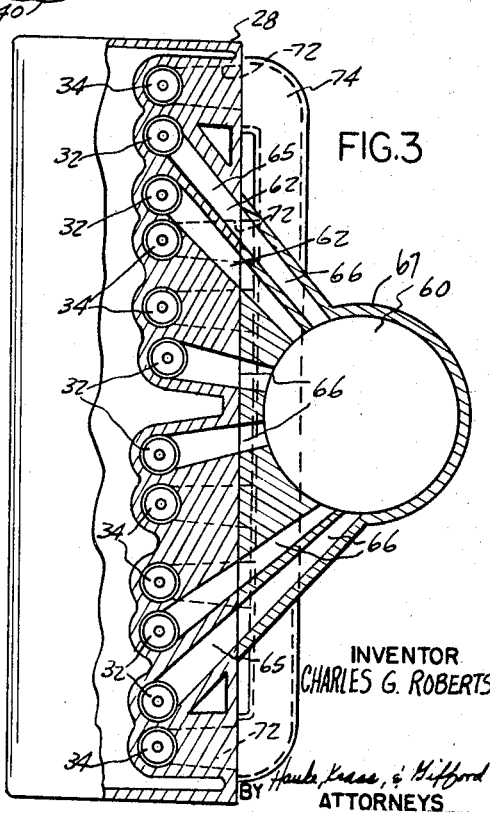
FIG. 3 is a longitudinal cross-sectional view thereof substantially from line 3—3 of FIG. 1.

Referring now to the drawings, and more particularly to FIGS. 1–3 thereof, an internal combustion engine 10, of the type having a plurality of cylinders disposed in line, in the particular example illustrated, such an engine being a six cylinder in line, includes the usual and conventional elements of a cylinder block 12 having a plurality of parallelly disposed cylinders 14 adapted to be cooled by a coolant fluid circulating through the coolant jacket 16. Each cylinder 14 has a reciprocable piston 18 provided with rings 20, each piston being pivotally connected to a connecting rod 22 by way of a wrist-pin 24 disposed at the small end of the connecting rod, the big end of the connecting rod being pivotally connected to a crank throw 25 of a crankshaft 26 journalled in appropriate bearing blocks, not shown, at the bottom end of the cylinder block 12. A cylinder head 28 provided with coolant passageways 30 is bolted on the top of the cylinder block, in the conventional manner, and is provided with the usual intake and exhaust valves, as shown respectively at 32 and 34, operated respectively by cams 36 and 38 on cam-shaft 40 by way of the usual tappets 42, push rods 44 and rocker arms 46 pivoting on shaft 48 attached to the top of the cylinder head 28 by way of columns 50. Each valve is provided with a return coil spring 52 held in compression between the top surface of the cylinder head 28 and spring retainer 54 held proximate the end of the valve stem 56 by retainer 58.

Such an arrangement of elements is conventional, is well known in the internal combustion engine art and needs not be described in detail. It is also conventional in the internal combustion engine art to controllably place each cylinder in communication with an intake plenum chamber 60 which, in the event that the internal combustion engine is a spark ignition engine, is generally the plenum chamber of an air-fuel mixing device or carburetor, by way of an intake passageway 62 having an inlet in communication with the plenum chamber, and an outlet proximate the cylinder intake port 64 controlled by intake valve 32 and leading into combustion chamber 70 on the top of piston 18.

As best seen in FIGS. 1 and 3, each intake passageway 62 has a portion provided with an outlet at the intake port 64, which, as shown at 65, is formed in the cylinder head 28, substantially aligned with a portion 66 which is attached to or integral with the casing 67 of plenum chamber 60. Each intake passageway 62 thus defined is longitudinally frustoconical with its largest diameter portion proximate intake port 64. The conicity angle of each passageway has the same included angle $a$ which is comprised between 0 and 10° and is preferably about 6°.

As best seen in FIGS. 2 and 3, each exhaust valve 34 is adapted to alternately obturate and open an exhaust port 68 placing each combustion chamber 70 into communication with an exhaust passageway 72 during the exhaust cycle of the internal combustion engine in the course of which the combustion residual gases are exhausted to the atmosphere. Each exhaust passageway 72 places each exhaust port 68 in communication with an exhaust manifold 74, and all the exhaust passageways 72 are substantially frusto-conical in shape with their smallest diameter portion proximate the exhaust ports 68 and their largest diameter portion at their outlet into exhaust manifold 74. The conicity of frusto-conical exhaust passageways 72 is comprised between 0 and 10° of included angle $b$ and is preferably about 6°.

Figure 4:
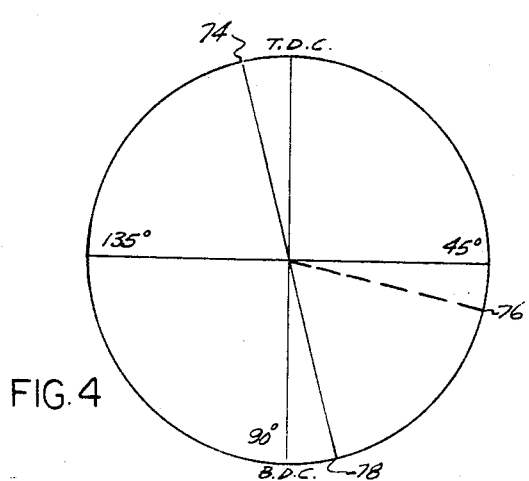
FIG. 4 is a diagram of the exhaust valve timing of an internal combustion engine provided with the improvement of the present invention.

It has been found that providing the intake passageways of an internal combustion engine with downstream longitudinal conicity comprised between 0 and 10°, and preferably with a conicity of about 6°, results in substantially improved air-fuel mixture charges being taken into each cylinder of the engine and in improved combustion of each of the charges during the firing cycle, accompanied by a better scavenging of the burnt gases exhausted when the exhaust port opens during the exhaust portion of the internal combustion engine cycle. The reason underlying such improvements are not entirely known, but it seems that providing internal combustion engines with such frusto-conical intake and exhaust passageways, with the largest diameter portion of each passageway being downstream with respect to the direction of flow of the fluid traveling through the passageway, results in a considerable acceleration of the fluid at the outlet of each passageway as compared to the velocity of the fluid at the inlet thereof. There is produced a ram effect of the intake air, in compression ignition engine, or of the air-fuel mixture, in spark-ignition engines, that permits to effectuate an air-fuel mixture that is considerably improved as compared to conventional means, qualitatively, i.e. with respect to the degree of intimate mixture between the air and the fuel, as well as quantitatively, i.e. with respect to the total amount of mixture introduced into the combustion chamber. Similarly, as a result of using frustoconical diverging passageways also in the exhaust system of an internal combustion engine, the scavenging of the burnt gases is so improved by the resulting ram effect that the timing of the opening of the exhaust valve at the end of each cylinder combustion cycle may be delayed such that full advantage is taken of the complete expansion of the burning air-fuel mixture. In conventional internal combustion engines, which are today designed with a substantially short piston stroke and with a large cylinder bore or, in other words, which are designed with a bore-to-stroke ratio substantially equal or greater than one, and which are capable to operate at substantially high revolutions per minute, it is common practice to open the exhaust port of each cylinder long before the end of the combustion cycle in order to provide adequate scavenging of the combustion residual gases from the cylinder. As shown in the chart of FIG. 4, which represents a complete revolution of an internal combustion engine crankshaft throw during the power and exhaust cycle of a particular cylinder, firing of the air-fuel mixture is effected in a spark ignition engine, or injection of the fuel is started in a compression ignition engine, shortly before the piston reaches top dead center, as shown at point 74 situated a few degrees before top dead center. The exhaust valve is normally timed to open in conventional engines long before bottom dead center, situated 180° from top dead center, or substantially at point 76 on the diagram of FIG. 4. By virtue of using the longitudinally frusto-conically shaped exhaust passageways of the present invention, the exhaust valve of each cylinder may be timed to open only shortly before bottom dead center or substantially at bottom dead center, as shown at 78, without compromise in any way to the proper scavenging of the cylinder, with the accompanying result of a greatly improved overall efficiency resulting from the fired charge being completely expanded and continuously pressing against the top of the piston up to the limit of the piston stroke when it reaches a position proximate to bottom dead center.

FIGS. 5-6 represent an example of application of the principles of the invention to an internal combustion engine of the spark-ignition type having its cylinders disposed in V. The arrangement of elements is otherwise substantially the same as precedently described with respect to FIGS. 1-4, and the operation of the invention is the same.

As shown in the drawings, the intake and exhaust passageways have a downstream conicity comprised between 0° and 10°, and of preferably about 6°. Each exhaust passageway 72 may be additionally provided, as best shown in FIG. 7, with an auxiliary air inlet 80 connected to a pipe 82 open to the atmosphere, the inlet 80 being preferably disposed proximate the exhaust port 68, such that substantially cooler air may be introduced into and mixed with the exhaust gases so as to considerably reduce their temperature and provide excess oxygen for completing the oxidation of any unburnt hydrocarbons and of carbon monoxide that may be present in the exhaust gases. It should, however, be appreciated that, as a result of providing an internal combustion engine with the intake and exhaust passageways of the present invention, there is a considerable reduction of the quantity of the exhaust unburnt hydrocarbons rejected into the atmosphere, to the point that the engine may be run on a lean mixture close to the ideal volumetric proportion of 18 to 1 of the air-to-fuel ratio, resulting from equal charges being distributed to all the cylinders of a multi-cylinder combustion engine. However, an engine modified according to the present invention could generally result in exhaust gases at higher temperature than would be the case with conventional engines due to the fact that the improved engine is capable of operating with a mixture which is much leaner. The air inlets 80 into the exhaust passageways 72 eliminate this inconvenience by providing additional cooling for the exhaust valves 34.

FIG. 8 is a schematic representation of a typical exhaust passageway according to the present invention, with the exhaust valve omitted for the sake of clarity. As previously explained, the passage 72 placing in communication the exhaust port 68 of the internal combustion engine combustion chamber with an exhaust plenum chamber or exhaust manifold 74 is bell-mouthed or frusto-conical with the diverging conicity directed in the direction of flow of the fluid flowing therethrough, such direction being shown in the drawing by arrows 84. Consequently, the diameter $d$ of the inlet of passageway 72 is smaller than diameter D of its outlet into exhaust manifold 74, in view of such diverging conicity of the passageway 72 having an included angle $b$ comprised between 0° and 10° and being preferably about 6°. Passageway 72 has a length L which, as determined experimentally, is preferably equal to substantially twice the diameter $d$ of the inlet of passageway 72, assuming that passageway 72 has a circular cross section, as shown at FIG. 9.

In order to provide for such a length L of passageway 72 being substantially equal to twice the diameter $d$ of its inlet, when the portion 86 of passageway 72 which is situated in the cylinder head 28 of an internal combustion engine is not long enough to fulfill the requirement of the total length of the passageway being substantially equal to twice the diameter $d$ of the inlet portion thereof, exhaust passageway 72 is so designed as to include a portion 84 affixed exteriorly of the cylinder head 28. Portion 84 of the passageway is fastened or formed integral with the exhaust manifold 74, such that the total length L of both portions 86 and 88 of exhaust passageway 72 is substantially equal to twice the diameter $d$ of the inlet of the passageway.

The diameter of the exhaust manifold 74, assuming that the manifold conduit is circular in cross-section, is preferably at least twice the diameter D of the outlet of exhaust passageway 72 into the manifold. It is evident that, when it is not feasible to have a circularly shaped conduit for the exhaust manifold 74, the transverse sectional area of the manifold is preferably twice the sectional area of the outlet of passageway 72 into the exhaust manifold.

As shown in FIG. 10, the exhaust passageway 72 may have a cross section which is substantially square-rectangular in shape, as shown, or which is of any other convenient shape, in cases where it is impractical to have circularly shaped exhaust passageways due to complications in coring the casting mold for the cylinder head, or to other prevalent engineering problems. Although circularly shaped frusto-conical passageways are the preferable configuration, it has been found that there exists only a small loss in fluid flow efficiency if the passageway is differently shaped in cross-section. However, whatever the transverse sectional shape of the passageway, the total length thereof must preferably be substantially equal to twice the diameter of an imaginary circular inlet having an area equal to the area of the actual inlet of the passageway. In other words, the length of passageway 72 must fulfill the following conditions:

$$L = 2d$$

Where the inlet of passageway 72 is circular, the area of the inlet is given by:

$$A = \P \frac{d^2}{4}$$

Consequently, $d^2 = \frac{4A}{\P}$ and $d = 2\sqrt{\frac{A}{\P}}$

As $L = 2d$, $L = 4\sqrt{\frac{A}{\P}}$

When conditions are such that, as illustrated in FIG. 11, the exhaust passageway 72, assumed to be circular in cross-section has a portion 86 included in the cylinder head 28 of the internal combustion engine having substantially straight walls, instead of having walls disposed in a frusto-conical fashion, the principles of the present invention are still applicable if the outlet of the portion 86 of the exhaust passageway disposed in the cylinder head 28 is connected to the manifold 74 by means of a frusto-conical portion 88 mounted upon, or made integral with, the manifold 74, and having a total length L substantially equal to twice the diameter $d$ of the inlet thereof. Preferably, included angle $b$ is, as previously mentioned, substantially equal to 6° and generally comprised between 0° and 10°.

Preferably also, as shown in FIGS. 7 and 8, one or more auxiliary air inlets or ports 80 are provided in the exhaust passageway 72. The ports 80 are placed in communication with the ambient by means of conduits such as 82. As previously indicated, such auxiliary air ports 80 are preferably disposed as closely as possible to the exhaust port 68, as shown in FIG. 8, which may necessitate substantial alterations to the cylinder head 28. Whereas such alterations are prohibitive in cost or in engineering difficulties, it is still quite satisfactory to dispose such auxiliary air ports 80 in the portion of the exhaust passageway 72 situated outside of the cylinder head, as shown in FIG. 11, the auxiliary air inlets or ports 80 being disposed as close as feasible to the inlet of exhaust passageway 72.

FIG. 12 represents a schematic enlarged view of an intake passageway 62 according to the present invention and as previously explained hereinbefore. The fluid circulating in such an intake passageway 62 flows in the direction of arrows 84 from an inlet of the passageway disposed in the plenum chamber 60 to intake port 64 leading into the engine cylinder combustion chamber. Intake passageway 82 has a total length L' which is substantially equal to twice the diameter $d$ of the inlet portion thereof, assuming that the passageway has a circular cross section, or which is substantially twice the diameter of an imaginary circle of an area equal to the actual area of the inlet of passageway 62, in the event that passageway 62 is shaped other than a circle in transverse section. The general longitudinal configuration of inlet passageway 62, as previously mentioned, is bell-mouthed or frusto-conical, with an included angle $a$ comprised between 0° and 10°, and preferably about 6°.

Internal combustion engines are not always so designed that it is always possible to utilize intake or exhaust passageways, leading to or from the engine combustion chambers, having substantially straight line longitudinal axes. The principles of the present invention, however, apply to longitudinally curved passageways as well as to straight passageways. For example, as shown in FIGS. 13–15, the principles of the invention can be applied to a 45-degree elbow passageway, the configuration illustrated herein being a 45-degree elbow exhaust passageway 72'. It should, however, be appreciated that the principles of the invention apply to a similarly curved intake passageway, and to differently bent intake or exhaust passageways. As shown in the drawings, the curved passageway 72' places an exhaust port 68 in communication with an exhaust manifold 74. Passageway 72' has a total length L which is substantially equal to twice the diameter $d$, assuming the passageway 72' to be substantially circular in cross-section. Passageway 72' can be considered as being made up of an infinity of smaller elements 92 each having a length $\Delta L$ and each having a conicity of included angle $b$ comprised between 0° and 10° and preferably of 6°. Consequently, the total length L of the passageway 72' is equal to the sum of the individual element lengths $\Delta L$, and such total length L is substantially equal to twice the diameter $d$ of the inlet of the passageway.

Having thus described the invention by way of examples of typical applications thereof to internal combustion engines, what it is sought to be protected by United States Letters Patent is as defined in the appended claims.

I claim:

1. In an internal combustion engine having a crankshaft and at least one cylinder and intake and exhaust valves controllably placing said cylinder in fluid communication with respectively an intake plenum chamber and an exhaust manifold, the improvement comprising: a frusto-conical passageway disposed between said intake plenum chamber and said intake valve; said frusto-conical passageway having its larger cross-area end disposed proximate said intake valve.

2. The improvement of claim 1 wherein said passageway has a conicity comprised between about 0° and 10° included angle.

3. The improvement of claim 2 wherein said passageway has a length which is substantially equal to $$4\sqrt{\frac{A}{\pi}}$$

A being the area of the inlet of said passageway.

4. The improvement of claim 1 further comprising: a frusto-conical passageway disposed between said exhaust valve and said exhaust manifold and having its smaller cross-area end proximate said exhaust valve.

5. The improvement of claim 4 wherein said frusto-conical passageway disposed between said exhaust valve and said exhaust manifold has a conicity comprised between about 0° and 10° included angle.

6. The improvement of claim 5 wherein said last mentioned passageway has a length which is substantially equal to $$4\sqrt{\frac{A}{\pi}}$$

A being the area of said smaller cross-area end.

7. The improvement of claim 5 wherein the cross-area of said exhaust manifold is substantially twice the area of the larger cross-area end of said passageway.

8. The improvement of claim 4 wherein said exhaust valve opens at the end of the combustion cycle of said cylinder shortly before bottom dead center of the rotation of said crankshaft.

9. The improvement of claim 4 further comprising: auxiliary air inlet means in said passageway between said exhaust valve and said exhaust manifold.

10. The improvement of claim 9 wherein said auxiliary air inlet means is disposed proximate said exhaust valve.

11. In an internal combustion engine having a crankshaft and at least one cylinder and intake and exhaust valves controllably placing said cylinder in fluid communication with respectively an intake plenum chamber and an exhaust manifold, the improvement comprising: a frusto-conical passageway disposed between said exhaust valve and said exhaust manifold; said frusto-conical passageway having its smallest cross-area end disposed proximate said exhaust valve.

12. The improvement of claim 11 wherein said passageway has a conicity comprised between about 0° and 10° included angle.

13. The improvement of claim 11 wherein said passageway has a length which is substantially equal to $$4\sqrt{\frac{A}{\pi}}$$

A being the area of said smallest cross-area end.

14. The improvement of claim 12 wherein the cross-area of said exhaust manifold is substantially at least twice the area of the larger cross-area end of said passageway.

15. The improvement of claim 11 wherein said exhaust valve opens at the end of the combustion cycle of said cylinder shortly before bottom dead center of the rotation of said crankshaft.

16. The improvement of claim 11 further comprising: auxiliary air inlet means in said passageway.

17. The improvement of claim 11 wherein said auxiliary air inlet means is disposed proximate said exhaust valve.

(References on following page)

References Cited

UNITED STATES PATENTS 908,527  1/1909  Weiss ---------------- 60—30
3,285,002 11/1966 Hines ---------------- 60—30

FOREIGN PATENTS 610,114  10/1948  Great Britain.

WENDELL E. BURNS, *Primary Examiner.*

123—52, 75, 188, 193; 60—29, 30